United States Patent
Crisan et al.

(10) Patent No.: US 8,374,444 B2
(45) Date of Patent: Feb. 12, 2013

(54) METHOD AND APPARATUS FOR PROVIDING HIGHER RESOLUTION IMAGES IN AN EMBEDDED DEVICE

(75) Inventors: Adrian Crisan, San Diego, CA (US); Nikolaos Georgis, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 826 days.

(21) Appl. No.: 12/187,348

(22) Filed: Aug. 6, 2008

(65) Prior Publication Data

US 2010/0034477 A1 Feb. 11, 2010

(51) Int. Cl.
*G06K 9/32* (2006.01)
*G06K 9/36* (2006.01)
*G06K 9/46* (2006.01)

(52) U.S. Cl. ........ 382/235; 382/232; 382/298; 382/299; 382/300

(58) Field of Classification Search .......... 382/232, 382/299, 300, 235
See application file for complete search history.

(56) References Cited

U.S. PATENT DOCUMENTS

| | | | |
|---|---|---|---|
| 6,510,177 B1 * | 1/2003 | De Bonet et al. | 375/240.16 |
| 7,447,383 B2 * | 11/2008 | Lee | 382/300 |
| 2005/0232514 A1 | 10/2005 | Chen | |
| 2007/0019887 A1 | 1/2007 | Nestares et al. | |
| 2007/0223909 A1 | 9/2007 | Tanaka | |
| 2007/0242883 A1 | 10/2007 | Kruppa | |
| 2007/0253479 A1 | 11/2007 | Mukherjee | |
| 2009/0080804 A1 * | 3/2009 | Hamada et al. | 382/298 |
| 2009/0153683 A1 | 6/2009 | Furukawa | |

FOREIGN PATENT DOCUMENTS

| | | |
|---|---|---|
| EP | 2 161 686 A3 | 2/2012 |
| JP | 2003-163931 A | 6/2003 |
| JP | 2007-323616 A | 12/2007 |
| JP | 2008-053848 A | 3/2008 |
| WO | WO 2009149601 A1 * | 12/2009 |

OTHER PUBLICATIONS

Gunturk et al., "Super-Resolution Reconstruction of Compressed Video Using Transform-Domain Statistics", IEEE Transactions on Image Processing, vol. 13 No. 1, 2004, pp. 33-43.*
Martins et al., "A Unified Approach to Restoration, Deinterlacing and Resolution Enhancement in Decoding MPEG-2 Video", IEEE Transactions on Circuits and Systems for Video Technology, vol. 12 No. 9, 2002, pp. 803-811.*
Segall et al., "High-Resolution Images from Compressed Video", IEEE Signal Processing Magazine, vol. 20 Issue 3, 2003, pp. 37-48.*
Irani, Michal and Peleg, Shmuel, "Motion Analysis for Image Enhancement: Resolution, Occlusion, and Transparency," Journal of Visual Communication and Image Representation, vol. 4, No. 4, Dec. 1993, pp. 324-335.

(Continued)

*Primary Examiner* — Matthew Bella
*Assistant Examiner* — Jose M Torres
(74) *Attorney, Agent, or Firm* — Sony Corporation of America

(57) ABSTRACT

A method and apparatus to providing higher resolution images on an embedded device by performing a super resolution technique on a compressed image sequence and one or more motion vectors are described. In one example, the method includes compressing an image sequence using a video compression technique, wherein the image sequence comprises a plurality of lower resolution images and applying a super resolution technique to the compressed image sequence to generate a higher resolution image.

18 Claims, 5 Drawing Sheets

OTHER PUBLICATIONS

Stark, Henry and Oskoui, Peyma, "High-resolution image recovery from image-plane arrays, using convex projections," Journal of the Optical Society of America, vol. 6, No. 11, Nov. 1989, pp. 1715-1726.

Schultz, Richard R. and Stevenson, Robert L., "A Bayesian Approach to Image Expansion for Improved Definition," IEEE Transactions on Image Processing, vol. 3, No. 3, May 1994, pp. 233-242.

Mera, N. S., Elliott, L. and Ingham, D. B., "On the Use of Genetic Algorithms for Solving Ill-Posed Problems," Inverse Problems in Engineering, 2003, vol. 11, No. 2, pp. 105-121.

Ben-Ezra, Moshe et al., "Jitter-Camera provides super-resolution video with controlled sub-pixel detector shifts," downloaded from web site http://spie.org/x8785.xml on Apr. 24, 2008, Copyright 2007, Pangea3.

Georgiev, Mihail et al.,"D26.2 Technical Report # 2 on 3D Time-varying Scene Capture Technologies," downloaded from web site http://www.3dtv-research.org/publicDocs/techReports07/D26.2_WP7_TR2.pdf on Apr. 24, 2007. Date of Publication: Mar. 2007.

"Extraction of High-Resolution Video Stills From MPEG Image Sequences" Debin Chen and Richard R. Schultz, Department of Electrical Engineering, University of North Dakota, Grand Forks, ND, IEEE 1998; pp. 465-469.

"Super-Resolution Still and Video Reconstruction From MPEG-Coded Video", Yucel Altunbasak, Andrew J. Patti, and Russell M. Mersereau, IEEE Transactions on Circuits and Systems for Video Technology, vol. 12, No. 4, Apr. 2002, pp. 217-226.

"Reconstruction of High-Resolution Image Frames From a Sequence of Low-Resolution and Compressed Observations", C. Andrew Segall, Rafael Molina, Aggelos K. Katsaggelos, and Javier Mateos, Department of Electricla and Computer Engineering, Northwestern University, Evanston, IL, Departamento de Ciencias de la Computación e I.A., University of Granada, Granada, Spain, IEEE 2002, pp. 1701-1704.

European Search Report mailed Jan. 2, 2012 for European Patent Application No. 09251917.0-2223/2161686.

* cited by examiner

METHOD AND APPARATUS FOR PROVIDING HIGHER RESOLUTION IMAGES IN AN EMBEDDED DEVICE

BACKGROUND

1. Field of the Invention

Embodiments of the present invention generally relate to embedded devices and, more particularly, to a method and apparatus for providing higher resolution images in an embedded device using a super resolution technique.

2. Description of the Related Art

A user of a camera device may "take a picture" of an object by generating a digital image of the object in particular image resolution. Generally, a digital image includes pixel data that represents the object and image resolution refers to an amount of detail for the digital image. Occasionally, the digital image generated by the camera device may be distorted. For example, handshaking (e.g., camera jitter) may cause distortions (e.g., blurring) in the digital image.

Sometimes, a super resolution technique may be used to mitigate the effects of handshaking. The super resolution technique is configured to produce a higher resolution image from one or more lower resolution images. The super resolution technique predicts the missing details (e.g., pixel data) from the lower resolution images using motion estimation and deblurring techniques. The missing details are applied to the one or more lower resolution images to produce the higher resolution image.

Currently, the super resolution techniques are not performed on an embedded device due to processor and memory limitations. An embedded device may be a device with a built-in camera, such as a mobile phone, a Personal Digital Assistant (PDA), a "smart phone" and the like. Due to size restrictions, the embedded device is limited to a particular amount of memory devices and/or processor resources. The raw and uncompressed images are considerably large in size and consume a significant amount of the memory. As a result, there are too many images for the processor to perform the super resolution technique while the embedded device is being used.

Currently, the super resolution techniques are performed offline on the embedded device prior to synchronization in which the lower resolution images may be saved into a device memory. Processing is done offline prior to transferring lower resolution images from the embedded device to another device (e.g., a computer). The user, however, is not able to view a high resolution image on a lower resolution screen.

Therefore, there is a need in the art for providing higher resolution images in an embedded device.

SUMMARY OF THE INVENTION

Embodiments of the present invention comprise a method, an apparatus and an embedded device for providing higher resolution images by performing a super resolution technique on a compressed image sequence using one or more motion vectors. In one embodiment, a method for using a video compression technique to enable super resolution in an embedded device comprises compressing an image sequence using a video compression technique, wherein the image sequence comprises a plurality of lower resolution images and applying a super resolution technique to the compressed image sequence to generate a higher resolution image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
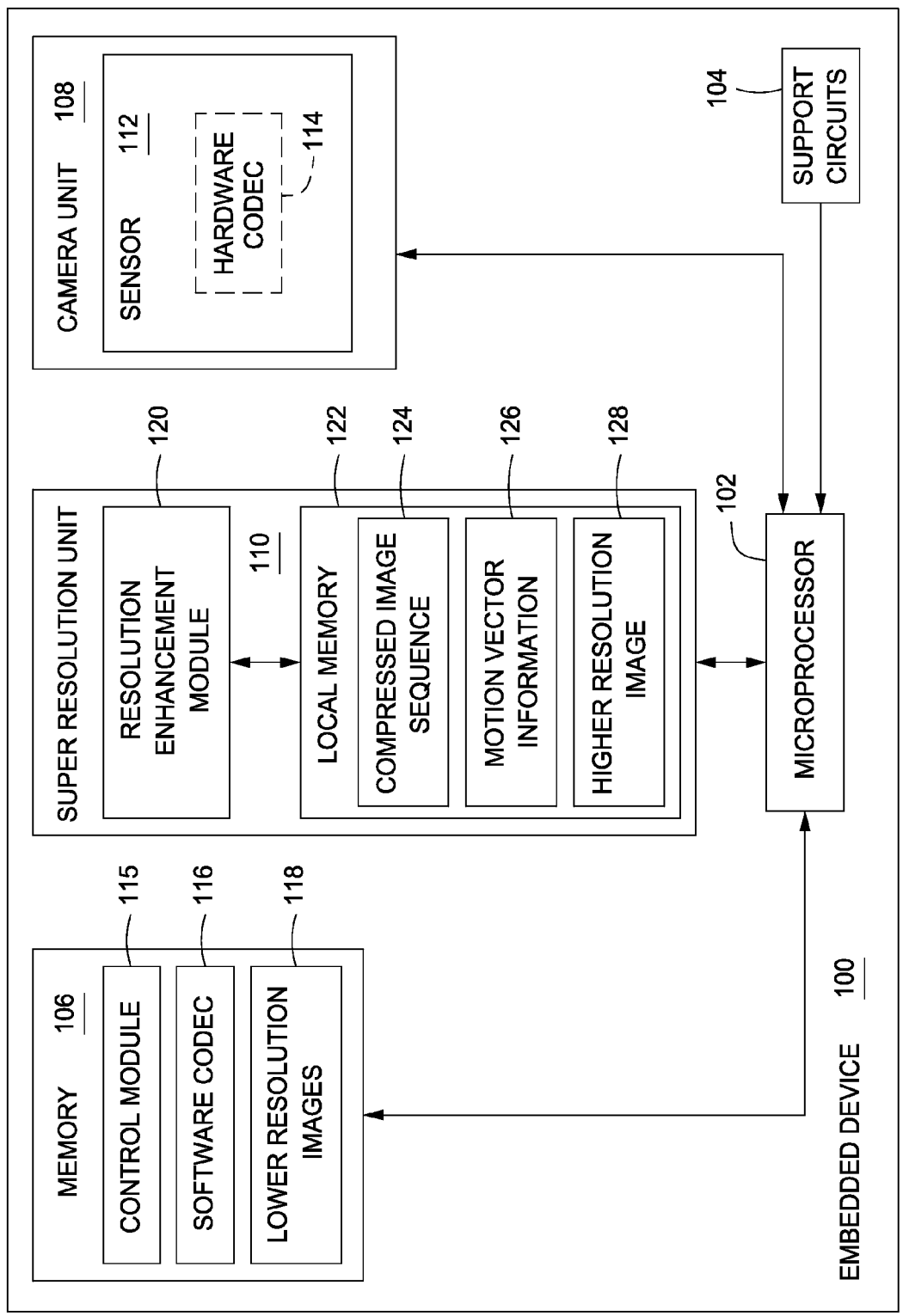
FIG. 1 is a block diagram of an embedded device for performing a super resolution technique on a compressed image sequence to produce a higher resolution image, in accordance with one or more embodiments.

FIG. 1 is a block diagram of an embedded device 100 for performing a super resolution technique on a compressed image sequence to produce a higher resolution image according to one or more embodiments of the present invention. The compressed image sequence may be compressed using a lossless or a near-lossless video compression technique.

The embedded device 100 may be a mobile phone, a camera phone, a smart phone, a Personal Digital Assistant (PDA)), such as those generally known in the art. The embedded device 100 includes a microprocessor 102, various support circuits 104, a memory 106, a camera unit 108 and a super resolution unit 110. The microprocessor 102 facilitates data processing and storage. The various support circuits 104 facilitate the operation of the microprocessor 102 and include at least one of clock circuits, power supplies, cache, input/output circuits, and the like. The memory 106 comprises at least one of Read Only Memory (ROM), Random Access Memory (RAM), disk drive storage, optical storage, removable storage, and the like. The memory 106 includes a control module 115, a software codec 116 and lower resolution images 118. Generally, the software codec 116 includes software code for compressing an image sequence using a lossless video compression technique (e.g., Huffman-compressed YUV, CorePNG and the like) or near lossless video compression technique (e.g., DV compression, FastCodec and the like). In one embodiment, the software codec 116 employs an inter-prediction technique to process a sequence of raw images. The software codec 116 can estimate motion vectors between consecutive images using a motion vector estimation technique. Various motion estimation techniques that can be used by the software codec 116 are known in the art. In one embodiment, the software codec 116 divides a lower resolution image of the lower resolution images 118 into multiple pixel blocks and performs inter-prediction and compression on a block-by-block basis. In some embodiments, the camera unit 108 may include a hardware codec 114 that performs the functionality of the software codec 116 in hardware.

In one embodiment, the camera unit 108 includes a commercially available embedded image generation device (e.g., a built-in camera). By the way of example and not as a limitation, the camera unit 108 is used to capture multiple raw images as an image sequence (e.g., uncompressed image sequence). The camera unit 108 includes a sensor 112 (i.e., an image sensor). In one embodiment, the sensor 112 stores the captured image sequence into the memory 106 as the lower resolution images 118. In another embodiment, the sensor 112 converts the captured image sequence into an electric signal that may be communicated to various portions of the embedded device 110 via the microprocessor 102. For example, the sensor 112 may communicate with the super resolution unit 110.

Generally, the super resolution unit 110 is a component of the embedded device 100 that includes a resolution enhancement module 120 and a local memory 122. The local memory 122 comprises at least one of a Read Only Memory (ROM), a Random Access Memory (RAM), disk drive storage, optical storage, removable storage, and the like. The local memory 122 includes a compressed image sequence 124, motion vector information 126 and a higher resolution image 128. In one or more embodiments of the present invention, the super resolution unit 110 stores the compressed image sequence 124 and the motion vector information 126 as created through the use of the hardware codec 114 or the software codec 116. As described further below, the resolution enhancement module 120 applies one or more super resolution techniques on the compressed image sequence 124 and the vector information 126 in order to generate the higher resolution imager 128. Various super resolution techniques that are known in the art can be used with the invention. Notably, the resolution enhancement module 120 applies the super resolution technique(s) without completely recovering the lower resolution images 118 from the compressed image sequence 124.

According to various embodiments of the present invention, the control module 115 includes software code for managing the creation of the high resolution image 128 from a raw, uncompressed image sequence of lower resolution images. In operation, the control module 115 coordinates the compression of the raw images and the application of the super resolution technique on the compressed image sequence 124. In one embodiment, the control module 115 executes the software codec 116 to compress the lower resolution images 118 and stores the compressed image sequence 124 in the local memory 122. Accordingly, the lower resolution images 118 may be removed in order to free memory resources. In one embodiment, the compressed image sequence 124 includes a reference image (e.g., a first image of the image sequence), one or more motion vectors and one or more difference images (e.g., pixel data representing the difference between an original image and a predicted version of the original image based on the reference image). The reference image and/or the one or more difference images may be compressed using a lossless compression technique. A motion vector estimation technique may be employed to determine the one or more motion vectors. For purposes of clarity by example, the compressed image sequence 124 is described herein as having a single reference image. Those skilled in the art will appreciate that the compressed image sequence 124 may include multiple reference images.

In some embodiments, an original image is any image in the uncompressed image sequence. A reference image is one of the original images. For a difference image, a predicted image is formed by computing motion vectors with respect to the reference image, and then motion compensating a reconstructed version of the reference image using the motion vectors. The difference image is formed by subtracting the predicted image from the original image being coded. This inter-prediction may be performed on a block-by-block basis for each original image in the sequence after the reference image. In this manner, the compressed image sequence 124 and the motion vector information 126 are produced. While specific embodiments of inter-prediction are described herein, those skilled in the art will appreciate that the software codec 116 and/or the hardware codec 114 may perform other inter-prediction processes similar to those described herein, such as inter-prediction used in the Moving Picture Experts Group (MPEG) standards known in the art.

According to one embodiment, handshaking of the embedded device 100 may cause one or more differences between the lower resolution images that form the uncompressed image sequence. The lower resolution images may be generated from an identical scene but include different pixel data for representing the identical scene due to movements (i.e., shaking) of the embedded device 100. Because the pixel data may differ, one lower resolution image may include additional details not captured in another lower resolution image. Accordingly, details from two or more lower resolution images may be combined to produce a high resolution image.

According to various embodiments of the present invention, the resolution enhancement module 120 performs one or more super resolution techniques on the compressed image sequence 124 to generate the higher resolution image 128. According to one embodiment, the super resolution technique(s) include temporal interpolation and/or spatial interpolation of the reference image and the difference images. For example, the super resolution technique(s) interpolate missing details of the scene from the reference image, the motion vectors and the difference images. Subsequently, the resolution enhancement module 120 uses the missing details to improve the resolution of the reference image.

In one embodiment, the compressed image sequence is not completely decoded to recover all of the lower resolution images 118 prior to the application of the super resolution techniques by the resolution enhancement module 120. In other words, the super resolution technique is not performed on a decoded image sequence (e.g., the lower resolution images 118 according to one or more embodiments of the present invention. The super resolution technique may be performed directly on the compressed image sequence 124. In one embodiment, the resolution enhancement module 120 performs the super resolution technique on the compressed image sequence 124 at a block level (i.e., blocks of pixels at a time). That is, given the reference image, motion vectors and difference images, the resolution enhancement module 120 can begin decoding the compressed image sequence 124 on a block-by-block basis. The super resolution techniques can then be applied as each block is decoded to produce the higher resolution image 128. By performing super resolution on a block-by-block basis, the resolution enhancement module 120 does not have to wait for all of the original images to be decoded and does not have to store all of the original images in memory.

In one embodiment, the motion vector information 126 includes data regarding motion vectors (e.g., two-dimensional motion vectors) between the reference image and subsequent images in the sequence. Each motion vector provides an offset from coordinates in a reference image to coordinates in a next image. In one or more embodiments, the motion vectors are determined at sub-pixel accuracy (e.g., one-hundredth of a pixel) by the software codec 116 or the hardware codec 114. The resolution enhancement module 120 uses the sub-pixel accurate motion vectors to generate the higher resolution image 128 from the reference image and the difference images at a block level according to one embodiment.

According to one embodiment, the camera unit 108 and the super resolution unit 110 cooperate to generate the higher resolution image 128 from the lower resolution images 118. By the way of example and not as limitation, the sensor 112 of the camera unit 108 captures multiple lower resolution images, which are stored as the lower resolution images 118. The software codec 116 compresses the lower resolution images 118 using a lossless or near lossless video compression technique. During the compression stage, the software codec 116 also computes motion vectors between consecutive lower resolution images in the image sequence at sub-pixel accuracy Optionally, the sensor 112 includes a hardware codec 114. In one or more embodiments of the present invention, the hardware codec 114 is a component that implements a lossless or a near lossless video compression technique. In one embodiment, the hardware codec 114 divides a lower resolution image of the lower resolution images 118 into multiple pixel blocks. In operation, as raw images are captured by the sensor 112, the hardware codec 114 compresses the image sequence using the lossless or a near lossless video compression technique with inter-prediction, as described above with respect to the software codec 116. As a result, the compressed image sequence 124 is generated and stored in the super resolution unit 110. According to one embodiment, the resolution enhancement module 120 applies a super resolution technique on the compressed image sequence 124 and generates the high resolution image 128. In one embodiment, the hardware codec 114 enables the performance of the lossless or near lossless video compression technique on the image sequence before storage in the memory 106. Consequently, memory space is saved because the lower resolution images 118 do not need to be stored in order to produce the high resolution image 128.

Figure 2:
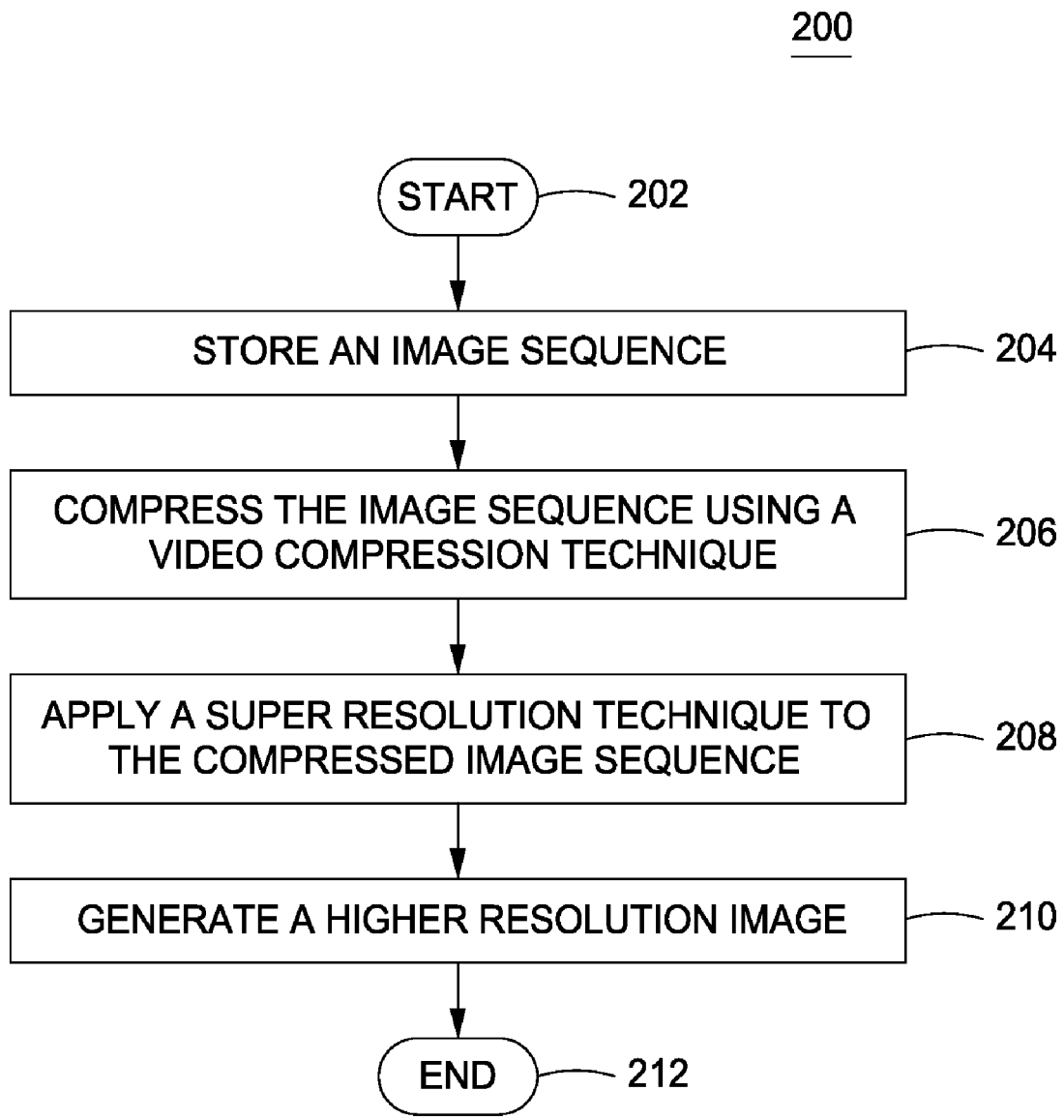
FIG. 2 is a flow diagram of a method for using a video compression technique to enable super resolution in an embedded device, in accordance with one or more embodiments.

FIG. 2 is a flow diagram of a method 200 for using a video compression technique to enable super resolution in an embedded device and to generate a higher resolution image according to one embodiment. The method 200 starts at step 202 and proceeds to step 204, where an image sequence (e.g., a plurality of lower resolution images) is stored in a local memory (e.g., the local memory 122 of FIG. 1).

At step 206, the image sequence is compressed using a lossless video compression technique with inter-prediction. In another embodiment, a near lossless video compression codec is used to compresses the image sequence. At step 208, a super resolution technique is applied to the compressed image sequence (e.g., the compressed image sequence 124 of FIG. 1). At step 210, a higher resolution image (e.g., the higher resolution image 128 of FIG. 1) is generated. At step 212, the method 200 ends. In one embodiment, the resolution enhancement module (e.g., the resolution enhancement module 120 of FIG. 1) applies the one or more super resolution technique on a reference image, one or more motion vectors and one or more difference images as described above.

Figure 3:
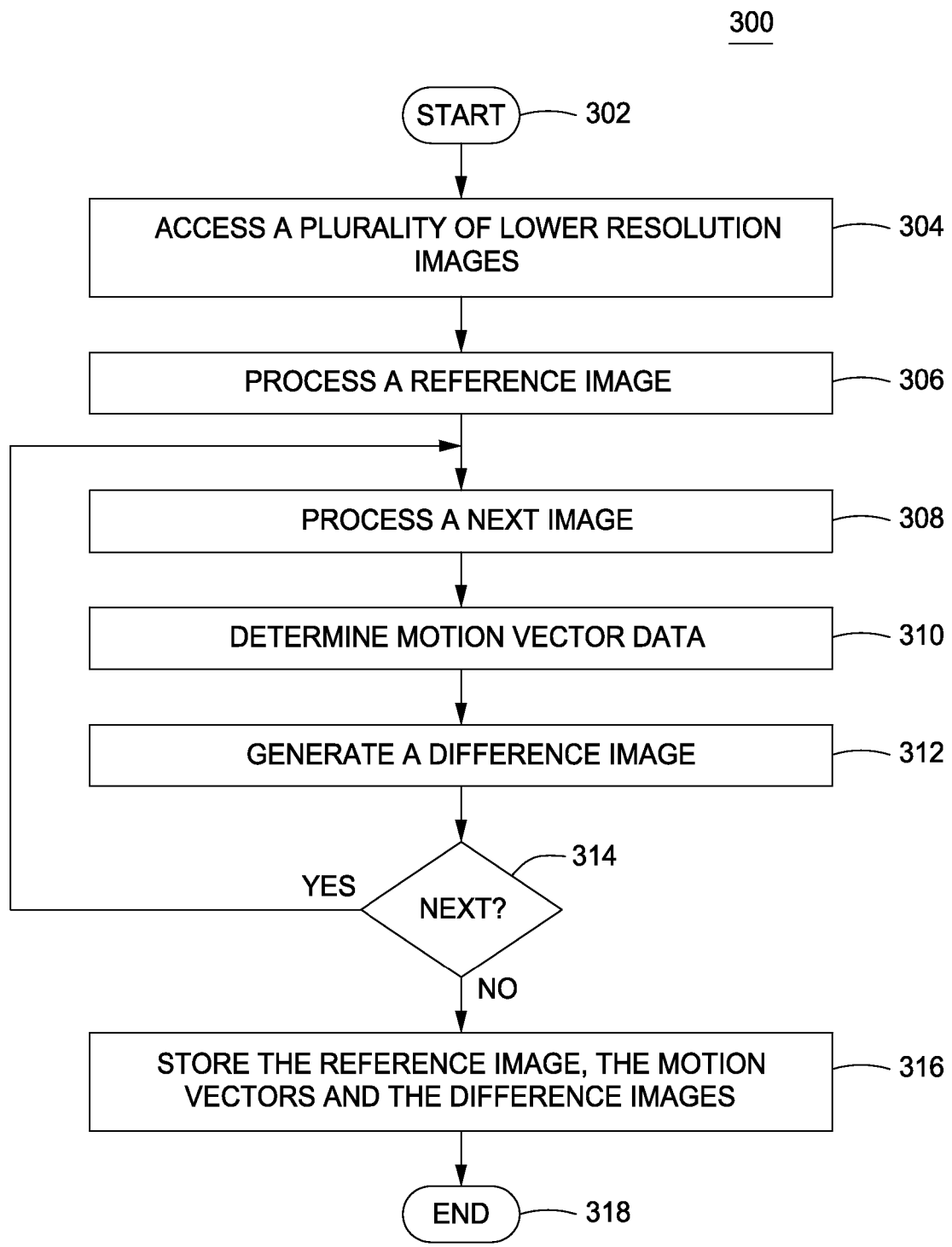
FIG. 3 is a flow diagram of a method for compressing a plurality of lower resolution images to enable super resolution on an embedded device, in accordance with one or more embodiments.

FIG. 3 is a flow diagram of a method 300 for compressing a plurality of lower resolution images to enable super resolution on an embedded device according to one embodiment. The method 300 starts at step 302 and proceeds to step 304, where a plurality of lower resolution images is accessed from a memory (e.g., the memory 106 of FIG. 1).

At step 306, a reference image (i.e., a first image of the lower resolution images) is processed (e.g., compressed using a lossless or near lossless algorithm). At step 308, a next image (i.e., a next lower resolution image) is obtained. At step 310, a motion vector between the next image and the reference image is determined. In one embodiment, the motion vector estimation technique determines motion vectors at sub-pixel accuracy. At step 312, a difference image is generated. The difference image represents one or more differences (i.e., errors) between the next image and prediction of the next image derived from the reference image, as described above.

At step 314, a determination is made as to whether there is a next image in the image sequence to be processed. If, it is determined that there is a next image in the image sequence to be processed (Option "Yes") the method 300 proceeds to the step 308. If, at step 314 it is determined that no more images in the image sequence are to be processed (option "NO"), the method 300 proceeds to step 316. At step 316, the reference image, the motion vectors and the difference images are stored. In one embodiment, the reference image, the motion vectors and the difference images constitute the compressed image sequence, which is transmitted to a super resolution unit (e.g., the super resolution unit 110 of FIG. 1) of an embedded device. In another embodiment, the reference image and/or the difference images are compressed using a lossless compression technique before storage. At step 318, the method 300 ends.

Figure 4:
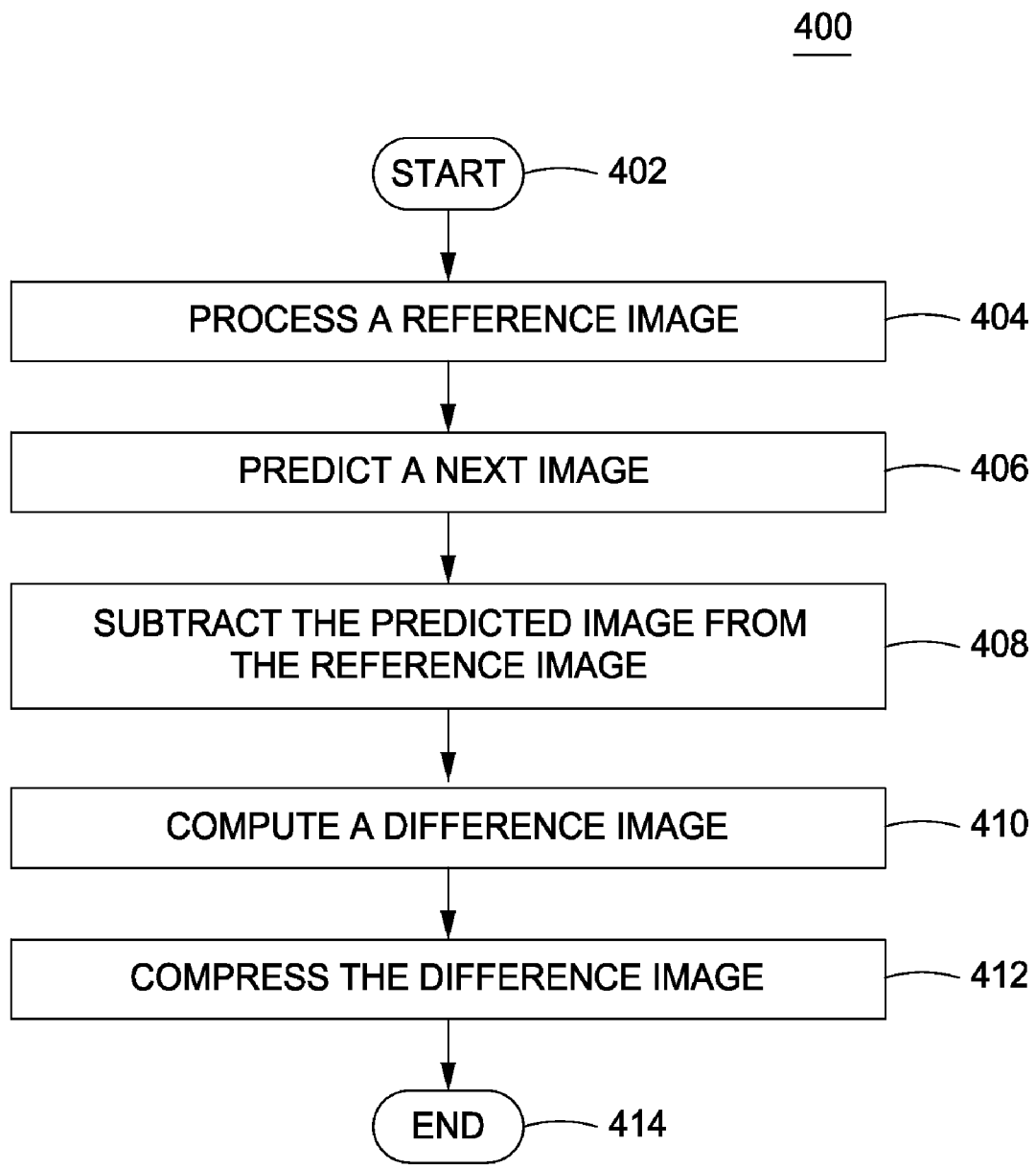
FIG. 4 is a flow diagram of a method for generating an difference image, in accordance with one or more embodiments.

FIG. 4 is a flow diagram of a method 400 for generating a difference image according to one embodiment. The method 400 starts at step 402 and proceeds to step 404, where a reference image and motion vectors are processed. At step 406, a prediction of an image being coded is generated from the reference image and the motion vectors. In one embodiment, a codec predicts the image being coded by applying the motion vectors to the first image (e.g., a previously coded and reconstructed image). At step 408, the predicted image is subtracted from the image being coded (e.g., observed or actual image). At step 410, a difference image is computed. At step 412, the difference image is compressed. At step 414, the method 400 ends.

Figure 5:
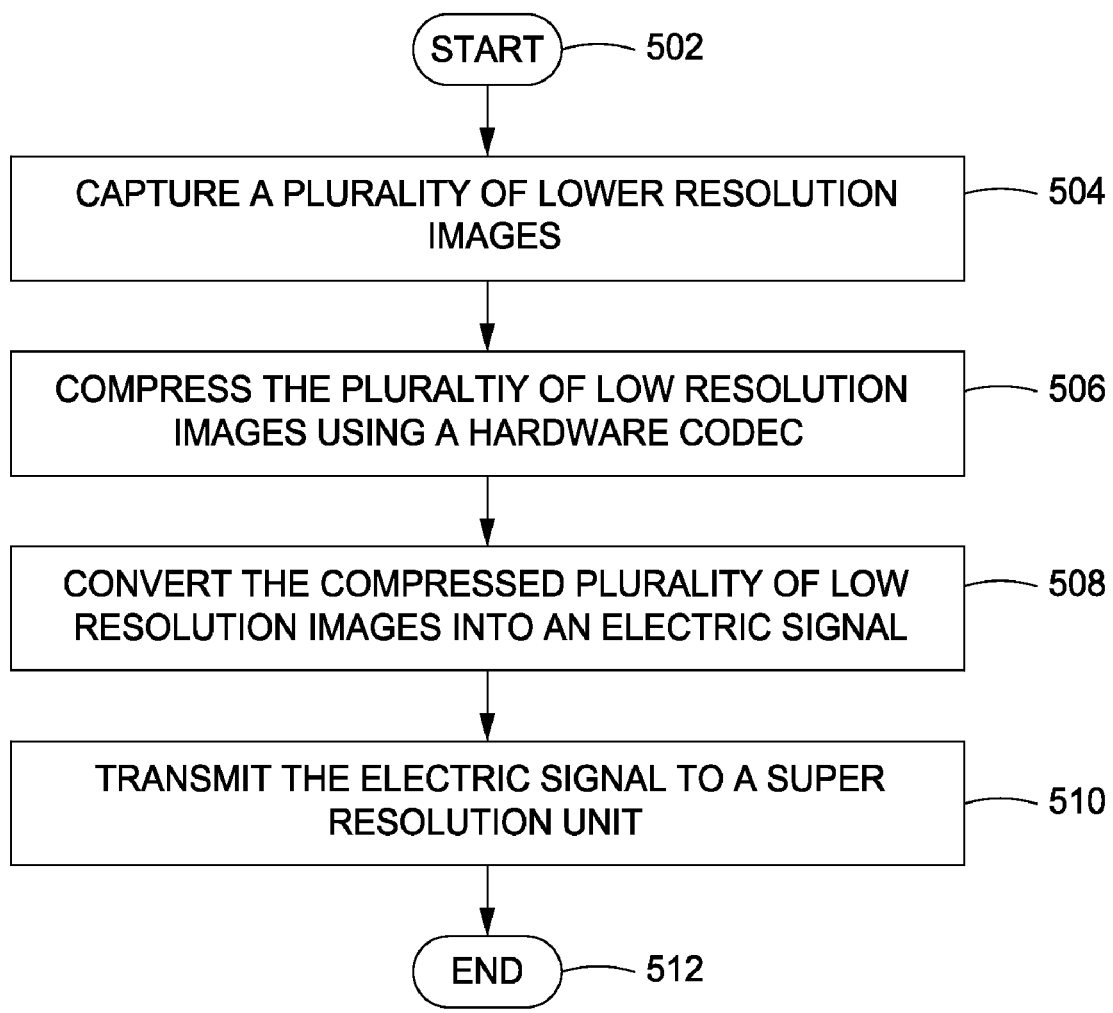
FIG. 5 is a flow diagram of a method for compressing an image sequence at a sensor of an embedded device, in accordance with one or more embodiments.

FIG. 5 is a flow diagram of a method 500 for compressing an image sequence at a sensor of an embedded device according to one embodiment. The method 500 starts at step 502 and proceeds to step 504, where a plurality of lower resolution images is captured. The lower resolution images are stored into a memory (e.g., the memory 106 of FIG. 1) as uncompressed, raw image sequence. At step 506, the plurality of lower resolution images is compressed using a hardware codec. In one or more embodiment, the hardware codec may implement a lossless or near-lossless hardware codec with inter-prediction, as described above. At step 508, the compressed plurality of lower resolution images is converted into an electric signal. At step 510, the electric signal is transmitted to a super resolution unit (e.g., the super resolution unit 110 of FIG. 1) and stored. The method 500 ends at step 512.

Thus, various embodiments of the present invention have been provided. The various embodiments of the present invention may advantageously enable super resolution in an embedded device. Further, the inventive method and apparatus may be utilized to operate directly on the compressed lower resolution image sequence. Further, the various embodiments may reduce an amount memory and processor resources that is required for optimal or efficient use of the embedded device.

While the foregoing is directed to embodiments of the present invention, other and further embodiments of the invention may be devised without departing from the basic scope thereof, and the scope thereof is determined by the claims that follow.

The invention claimed is:

1. A method for using a video compression technique to enable super resolution in an embedded device, comprising:

compressing an image sequence, the image sequence comprising a plurality of lower resolution images, by:
   determining motion vectors between a reference image and one or more additional images in the image sequence and applying the motion vectors to the reference image to form a predicted next image; and
   generating a difference image between the actual next image and the predicted next image;
   extracting a plurality of blocks of pixels for each image of the plurality of lower resolution images in the compressed image sequence; and
   applying a super resolution technique on a block by block basis to the extracted plurality of blocks of the compressed image sequence to sequentially generate a higher resolution image.

2. The method of claim 1, wherein compressing the image sequence further comprises:
   capturing the plurality of lower resolution images at a sensor; and
   compressing the plurality of lower resolution images using a hardware component of the sensor that implements the video compression technique.

3. The method of claim 1, wherein compressing the image sequence further comprises:
   storing the plurality of lower resolution images; and
   applying the video compression technique to the stored plurality of lower resolution images.

4. The method of claim 1, wherein compressing the image sequence further comprises computing a difference image between the at least one additional image and the prediction of the at least one additional image, respectively.

5. The method of claim 4, wherein compressing the image sequence further comprises compressing the difference image using a lossless video compression technique.

6. The method of claim 4, wherein compressing the image sequence further comprises compressing the difference image using a near lossless video compression technique.

7. The method of claim 1, wherein the video compression technique includes at least one of a lossless video compression technique or a near lossless video compression technique.

8. The method of claim 1, wherein applying the super resolution technique further comprises applying the super resolution technique on a reference image, at least one motion vector and at least one difference image.

9. The method of claim 1, wherein applying the super resolution technique further comprises mapping pixel data that forms at least a portion of the plurality of lower resolution images to pixel data that forms the higher resolution image.

10. The method of claim 1, wherein compressing the image sequence further comprises estimating at least one motion at sub-pixel accuracy.

11. The method of claim 1, wherein applying the super resolution technique further comprises:
   interpolating pixel data for the higher resolution image using the compressed image sequence and at least one motion vector, wherein the compressed image sequence comprises at least one difference image and a reference image; and
   combining the reference image with determined pixel data to form the higher resolution image.

12. An apparatus for using a compression technique executed by a processor to enable super resolution in an embedded device, comprising:
   a control module, stored in a memory and executed by the processor, for applying a compression technique to an image sequence that comprises a plurality of lower resolution images by:
   determining motion vectors between a reference image and one or more additional images in the image sequence and applying the motion vectors to the reference image to form a predicted next image; and
   generating a difference image between the actual next image and the predicted next image;
   a resolution enhancement module, stored in the memory and executed by the processor, for extracting a plurality of blocks of pixels for each image of the plurality of lower resolution images and performing a super resolution technique on a block by block basis on the extracted plurality of blocks of the compressed image sequence to produce a higher resolution image.

13. The apparatus of claim 12 further comprising a lossless codec for compressing the plurality of lower resolution images using a lossless compression technique.

14. The apparatus of claim 13, wherein the lossless codec applies a motion estimation technique to generate the motion vectors at sub-pixel accuracy.

15. The apparatus of claim 12 further comprising a near lossless codec for compressing the plurality of lower resolution images using a near lossless compression technique.

16. An embedded device for performing a super resolution technique on a compressed image sequence to produce a higher resolution image, comprising:
   a camera unit for capturing a plurality of lower resolution images;
   a codec for compressing the plurality of lower resolution images into a compressed image sequence by:
   determining motion vectors between a reference image and one or more additional images in the image sequence and applying the motion vectors to the reference image to form a predicted next image; and
   generating a difference image between the actual next image and the predicted next image;
   and
   a super resolution unit for extracting a plurality of blocks of pixels for each image of the plurality of lower resolution images and applying a super resolution technique on a block by block basis on the extracted plurality of blocks of the one or more compressed image sequence to generate a higher resolution image.

17. The embedded device of claim 16, wherein the codec is a hardware component within the camera unit, wherein the codec implements at least one of a lossless compression technique or a near lossless compression technique.

18. The embedded device of claim 16, wherein the codec is a software module that implements at least one of a lossless compression technique or a near lossless compression technique.

* * * * *